US010099959B2

(12) United States Patent
Christensen et al.

(10) Patent No.: US 10,099,959 B2
(45) Date of Patent: *Oct. 16, 2018

(54) CURABLE FIBERGLASS BINDER COMPRISING SALT OF INORGANIC ACID

(71) Applicant: JOHNS MANVILLE, Denver, CO (US)

(72) Inventors: Bernd Christensen, Wertheim (DE); Kiarash Alavi, Littleton, CO (US); Souvik Nandi, Highlands Ranch, CO (US); Jawed Asrar, Englewood, CO (US); Mingfu Zhang, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,180

(22) Filed: Feb. 15, 2017

(65) Prior Publication Data

US 2017/0158558 A1  Jun. 8, 2017

Related U.S. Application Data

(60) Continuation of application No. 14/511,356, filed on Oct. 10, 2014, now Pat. No. 9,604,878, which is a division of application No. 13/386,843, filed on Mar. 6, 2012, now Pat. No. 8,940,854, which is a continuation of application No. 12/539,263, filed on Aug. 11, 2009, now Pat. No. 9,365,963, which is a continuation of application No. 12/543,574, filed on Aug. 19, 2009, now Pat. No. 8,377,564, which is a continuation of application No. 12/543,586, filed on Aug. 19, 2009, now Pat. No. 8,651,285, which is a continuation of application No. 12/539,211, filed on Aug. 11, 2009, now abandoned, which is a continuation of application No. 12/543,625, filed on Aug. 19, 2009, now Pat. No. 8,372,900, which is a continuation of application No. 12/543,607, filed on Aug. 19, 2009, now Pat. No. 8,708,162.

(51) Int. Cl.
| | |
|---|---|
| *C03C 25/34* | (2006.01) |
| *C03C 25/10* | (2018.01) |
| *C03C 25/1095* | (2018.01) |
| *C03C 25/42* | (2006.01) |
| *C03C 25/24* | (2018.01) |
| *C03C 25/25* | (2018.01) |

(52) U.S. Cl.
CPC .......... *C03C 25/34* (2013.01); *C03C 25/1095* (2013.01); *C03C 25/246* (2013.01); *C03C 25/25* (2018.01); *C03C 25/42* (2013.01); *C03C 2217/29* (2013.01)

(58) Field of Classification Search
CPC ........................... C03C 25/1095; C03C 25/34
See application file for complete search history.

(56) References Cited

U.S. PATENT DOCUMENTS

| | | | |
|---|---|---|---|
| 1,801,053 | A | 4/1931 | Meigs |
| 2,334,545 | A | 11/1943 | DAlelio |
| 3,006,879 | A | 10/1961 | Ryan et al. |
| 3,383,267 | A | 5/1968 | Sunden |
| 3,438,931 | A | 4/1969 | Mitchell et al. |
| 3,513,001 | A | 5/1970 | Worthington et al. |
| 3,746,685 | A | 7/1973 | Dobinson et al. |
| 3,872,051 | A | 3/1975 | Tiedeman et al. |
| 3,920,613 | A | 11/1975 | Freeman et al. |
| 4,025,429 | A | 5/1977 | Neuschutz |
| 4,043,987 | A | 8/1977 | Jolicoeur et al. |
| 4,048,127 | A | 9/1977 | Gibbons et al. |
| 4,183,997 | A | 1/1980 | Stofko |
| 4,410,685 | A | 10/1983 | Williams |
| 4,524,164 | A | 6/1985 | Viswanathan et al. |
| 4,602,073 | A | 7/1986 | Skoultchi et al. |
| 4,692,478 | A | 9/1987 | Viswanathan et al. |
| 4,831,106 | A | 5/1989 | Kempter et al. |
| 5,149,722 | A | 9/1992 | Soukup |
| 5,158,999 | A | 10/1992 | Swales et al. |
| 5,243,015 | A | 9/1993 | Hutchings et al. |
| 5,321,120 | A | 6/1994 | Sommerfeld |
| 5,639,396 | A | 6/1997 | Thaler et al. |
| 5,705,599 | A | 1/1998 | Felixberger et al. |
| 5,905,115 | A | 5/1999 | Luitjes et al. |
| 6,194,477 | B1 | 2/2001 | Cawse et al. |
| 6,228,974 | B1 | 5/2001 | McCollum et al. |
| 6,387,506 | B1 | 5/2002 | Kawamura et al. |
| 6,495,655 | B2 | 12/2002 | Blount |
| 6,627,704 | B2 | 9/2003 | Yeager et al. |
| 6,630,231 | B2 | 10/2003 | Perez et al. |
| 6,822,042 | B2 | 11/2004 | Capps |
| 6,841,231 | B1 | 1/2005 | Liang et al. |
| 7,019,071 | B2 | 3/2006 | Inoue et al. |
| 7,217,458 | B2 | 5/2007 | Liu et al. |
| 7,265,169 | B2 | 9/2007 | Li et al. |
| 7,655,711 | B2 | 2/2010 | Swift et al. |
| 7,709,557 | B2 | 5/2010 | Medoff et al. |
| 7,772,347 | B2 | 8/2010 | Swift et al. |
| 7,807,771 | B2 | 10/2010 | Swift et al. |

(Continued)

FOREIGN PATENT DOCUMENTS

| | | |
|---|---|---|
| DE | 1905054 A1 | 8/1969 |
| DE | 43 08 089 A1 | 9/1994 |

(Continued)

OTHER PUBLICATIONS

Opposition filed Sep. 26, 2014 by Knauf Insulation to European Patent No. EP2464771 granted Dec. 25, 2013, 21 pages.

(Continued)

*Primary Examiner* — Liam J Heincer
(74) *Attorney, Agent, or Firm* — Robert D. Touslee

(57) ABSTRACT

A curable formaldehyde-free binding composition for use with fiberglass is provided. Such curable composition comprises an aldehyde or ketone and an amine salt of an inorganic acid. The composition when applied to fiberglass is cured to form a water-insoluble binder which exhibits good adhesion to glass. In a preferred embodiment the composition when applied to fiberglass provides a sufficient blackness required in facer products.

19 Claims, No Drawings

(56) References Cited

U.S. PATENT DOCUMENTS

| | | |
|---|---|---|
| 7,973,119 B1 | 7/2011 | McArdle et al. |
| 8,114,210 B2 | 2/2012 | Hampson et al. |
| 8,216,358 B2 | 7/2012 | Schafheutle et al. |
| 8,357,746 B2 | 1/2013 | Shooshtari |
| 8,372,900 B2 | 2/2013 | Shooshtari et al. |
| 8,377,564 B2 | 2/2013 | Shooshtari et al. |
| 8,651,285 B2 | 2/2014 | Shooshtari et al. |
| 8,708,162 B2 | 4/2014 | Shooshtari et al. |
| 2002/0158237 A1 | 10/2002 | Blount |
| 2003/0079833 A1 | 5/2003 | Pirhonen et al. |
| 2005/0059770 A1 | 3/2005 | Srinivasan et al. |
| 2005/0191924 A1 | 9/2005 | Taylor et al. |
| 2005/0221705 A1 | 10/2005 | Hitch |
| 2005/0257888 A1 | 11/2005 | Williamson et al. |
| 2006/0030634 A1 | 2/2006 | Dean et al. |
| 2007/0000839 A1 | 1/2007 | Wright et al. |
| 2007/0027283 A1 | 2/2007 | Swift et al. |
| 2007/0043173 A1 | 2/2007 | Pirhonen et al. |
| 2007/0082208 A1 | 4/2007 | Shooshtari et al. |
| 2007/0105467 A1 | 5/2007 | Bennett |
| 2007/0123679 A1 | 5/2007 | Swift et al. |
| 2007/0123680 A1 | 5/2007 | Swift et al. |
| 2007/0142596 A1 | 6/2007 | Swift et al. |
| 2008/0017552 A1 | 1/2008 | Wright et al. |
| 2008/0060546 A1 | 3/2008 | Symons |
| 2008/0145637 A1 | 6/2008 | Frank |
| 2008/0160854 A1 | 7/2008 | Nandi et al. |
| 2009/0011214 A1 | 1/2009 | Wang |
| 2009/0104458 A1 | 4/2009 | Ryu |
| 2009/0182108 A1 | 7/2009 | Shooshtari et al. |
| 2009/0317626 A1 | 12/2009 | Tiarks et al. |
| 2009/0324915 A1 | 12/2009 | Swift et al. |
| 2010/0087571 A1 | 4/2010 | Jackson et al. |
| 2010/0222463 A1 | 9/2010 | Brady et al. |
| 2010/0239642 A1 | 9/2010 | Campbell et al. |
| 2010/0255101 A1 | 10/2010 | Lu |
| 2010/0301256 A1 | 12/2010 | Hampson et al. |
| 2011/0009530 A1 | 1/2011 | Kasmayr et al. |
| 2011/0014487 A1 | 1/2011 | Gann et al. |
| 2011/0039111 A1 | 2/2011 | Shooshtari |
| 2011/0040010 A1 | 2/2011 | Shooshtari |
| 2011/0042302 A1 | 2/2011 | Shooshtari et al. |
| 2011/0042303 A1 | 2/2011 | Shooshtari et al. |
| 2011/0045966 A1 | 2/2011 | Shooshtari et al. |
| 2011/0046271 A1 | 2/2011 | Shooshtari et al. |
| 2012/0115994 A1 | 5/2012 | Breyer et al. |
| 2012/0152826 A1 | 6/2012 | Shooshtari et al. |
| 2012/0156954 A1 | 6/2012 | Eckert et al. |
| 2012/0315458 A1 | 12/2012 | Zheng et al. |

FOREIGN PATENT DOCUMENTS

| | | |
|---|---|---|
| DE | 102004033561 A1 | 9/2005 |
| DE | 102004061144 | 6/2006 |
| EP | 1510607 A1 | 3/2005 |
| EP | 1652868 A1 | 5/2006 |
| EP | 2223941 A1 | 9/2010 |
| EP | 2386605 A1 | 11/2011 |
| EP | 2464771 B1 | 12/2013 |
| EP | 2464772 B1 | 12/2013 |
| EP | 2467519 B1 | 12/2013 |
| GB | 902199 | 7/1962 |
| GB | 2451719 A | 2/2009 |
| WO | 2000 017120 | 3/2000 |
| WO | 2004 007615 A1 | 1/2001 |
| WO | 2003 022899 A1 | 3/2003 |
| WO | 2007 014236 A2 | 2/2007 |
| WO | 2008 089847 | 7/2008 |
| WO | 2009 010393 A1 | 1/2009 |
| WO | 2009 019235 | 2/2009 |
| WO | 2009 149334 A2 | 12/2009 |
| WO | 2010 106181 A1 | 9/2010 |
| WO | 2010 108999 A1 | 9/2010 |
| WO | 2010 142568 A1 | 12/2010 |
| WO | 2011 019590 A1 | 2/2011 |
| WO | 2011 019597 A1 | 2/2011 |
| WO | 2011 022227 A1 | 2/2011 |

OTHER PUBLICATIONS

Opposition filed Sep. 26, 2014 by Knauf Insulation to European Patent No. EP2467519 granted Dec. 25, 2013, 10 pages.

Opposition filed Sep. 26, 2014 by Knauf Insulation to European Patent No. EP2464772 granted Dec. 25, 2013, 13 pages.

Machine translation of DE 102004061144, Michi et al, Jun. 22, 2006.

CURABLE FIBERGLASS BINDER COMPRISING SALT OF INORGANIC ACID

CROSS-REFERENCE TO RELATED APPLICATION

This application is a continuation of U.S. Ser. No. 14/511,356, filed Oct. 10, 2014, which is a divisional of U.S. Ser. No. 13/386,843, filed Mar. 6, 2012, now U.S. Pat. No. 8,940,854, issued Jan. 27, 2015, which is a continuation of U.S. Ser. No. 12/539,263, filed Aug. 11, 2009, now U.S. Pat. No. 9,365,963, issued Jun. 14, 2016, which is a continuation of U.S. Ser. No. 12/543,574, filed Aug. 19, 2009, now U.S. Pat. No. 8,377,564, issued Feb. 19, 2013; which is a continuation of U.S. Ser. No. 12/543,586, filed Aug. 19, 2009, now U.S. Pat. No. 8,651,285, issued Feb. 18, 2014, which is a continuation of U.S. Ser. No. 12/539,211, filed Aug. 11, 2009, now abandoned, which is a continuation of U.S. Ser. No. 12/543,625, filed Aug. 19, 2009, now U.S. Pat. No. 8,372,900, issued Feb. 12, 2013, which is a continuation of U.S. Ser. No. 12/543,607, filed Aug. 19, 2009, now U.S. Pat. No. 8,708,162, issued Apr. 29, 2014, all of which are incorporated herein by reference.

BACKGROUND

The subject invention pertains to an improved binding composition for use with fiberglass. More specifically, the invention pertains to an improved curable composition comprising a mixture of an aldehyde or ketone and a salt of an inorganic acid. Once applied as a coating on the fiberglass, the binding composition is cured. The binder of the present invention is useful as a fully acceptable replacement for formaldehyde-based binders in non-woven fiberglass products, and actually provides a binder exhibiting improved physical properties.

Fiberglass binders have a variety of uses ranging from stiffening applications where the binder is applied to woven or non-woven fiberglass sheet goods and cured, producing a stiffer product; thermo-forming applications wherein the binder resin is applied to a sheet or lofty fibrous product, following which it is dried and optionally B-staged to form an intermediate but yet curable product; and to fully cured systems such as building insulation.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not fully space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins are not suitable for use as fiberglass binders. One skilled in the art of fiberglass binders would not look to cellulosic binders to solve any of the known problems associated with fiberglass binders.

Binders useful in fiberglass products generally require a low viscosity in the uncured state, yet possess characteristics so as to form a rigid thermoset polymeric binder for the glass fibers when cured. A low binder viscosity in the uncured state is required to allow the mat to be sized correctly. Also, viscous binders commonly tend to be tacky or sticky and hence they lead to the accumulation of fiber on the forming chamber walls. This accumulated fiber may later fall onto the mat causing dense areas and product problems.

From among the many thermosetting polymers, numerous candidates for suitable thermosetting fiberglass binder resins exist. However, binder-coated fiberglass products are often of the commodity type, and thus cost becomes a driving factor, generally ruling out resins such as thermosetting polyurethanes, epoxies, and others. Due to their excellent cost/performance ratio, the resins of choice in the past have been phenol-formaldehyde resins. Phenol-formaldehyde resins can be economically produced, and can be extended with urea prior to use as a binder in many applications. Such urea-extended phenol-formaldehyde binders have been the mainstay of the fiberglass industry for years, for example.

Over the past several decades however, minimization of volatile organic compound emissions (VOCs) and hazardous air pollutants (HAPS) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol-formaldehyde resole resins, changes in catalysts, and addition of different and multiple formaldehyde scavengers, has resulted in considerable improvement in emissions from phenol-formaldehyde binders as compared with the binders previously used. However, with increasingly stringent Federal regulations, more and more attention has been paid to alternative binder systems which are free from formaldehyde.

One such candidate binder system employs polymers of acrylic acid as a first component, and a polyol such as triethanolamine, glycerine, or a modestly oxyalkylated glycerine as a curing or "crosslinking" component. The preparation and properties of such poly(acrylic acid)-based binders, including information relative to the VOC emissions, and a comparison of binder properties versus urea-formaldehyde binders is presented in "Formaldehyde-Free Crosslinking Binders For Non-Wovens," Charles T. Arkins et al., TAPPI Journal, Vol. 78, No. 11, pages 161-168, November 1995. The binders disclosed by the Arkins article, appear to be B-stageable as well as being able to provide physical properties similar to those of urea/formaldehyde resins.

U.S. Pat. No. 5,340,868 discloses fiberglass insulation products cured with a combination of a polycarboxy polymer, a-hydroxyalkylamide, and at least one trifunctional monomeric carboxylic acid such as citric acid. The specific polycarboxy polymers disclosed are poly(acrylic acid) polymers. See also, U.S. Pat. No. 5,143,582.

U.S. Pat. No. 5,318,990 discloses a fibrous glass binder which comprises a polycarboxy polymer, a monomeric trihydric alcohol and a catalyst comprising an alkali metal salt of a phosphorous-containing organic acid.

U.S. 2007/0142596 discloses binders comprised of a mixture of Maillard reactants. The reactants comprise a monosaccharide and an ammonium salt of a polycarboxylic acid.

Published European Patent Application EP 0 583 086 A1 appears to provide details of polyacrylic acid binders whose cure is catalyzed by a phosphorus-containing catalyst system as discussed in the Arkins article previously cited. Higher molecular weight poly(acrylic acids) are stated to provide polymers exhibiting more complete cure. See also U.S. Pat. Nos. 5,661,213; 5,427,587; 6,136,916; and 6,221,973.

Some polycarboxy polymers have been found useful for making fiberglass insulation products. Problems of clumping or sticking of the glass fibers to the inside of the forming chambers during the processing, as well as providing a final product that exhibits the recovery and rigidity necessary to provide a commercially acceptable fiberglass insulation product, have been overcome. See, for example, U.S. Pat. No. 6,331,350. The thermosetting acrylic resins have been found to be more hydrophilic than the traditional phenolic binders, however. This hydrophilicity can result in fiberglass insulation that is more prone to absorb liquid water, thereby possibly compromising the integrity of the product. Also, the thermosetting acrylic resins now being used as binding agents for fiberglass have been found to not react as effectively with silane coupling agents of the type traditionally used by the industry increasing product cost. The addition of silicone as a hydrophobing agent results in problems when abatement devices are used that are based on incineration as well as additional cost. Also, the presence of silicone in the manufacturing process can interfere with the adhesion of certain facing substrates to the finished fiberglass material. Overcoming these problems will help to better utilize polycarboxy polymers in fiberglass binders.

Accordingly, in one aspect the present invention provides a novel, non-phenol-formaldehyde binder.

Another aspect of the invention provides a novel fiberglass binder which provides advantageous flow properties, the possibility of lower binder usage, the possibility of overall lower energy consumption, elimination of interference in the process by a silicone, and improved overall economics.

Still another aspect of the present invention is to provide a binder for fiberglass having improved economics, while also enjoying improved physical properties. In addition, the present invention increases the sustainable portion of the binder and reduces the dependency on a fossil based source for the resin.

These and other aspects of the present invention will become apparent to the skilled artisan upon a review of the following description and the claims appended hereto.

SUMMARY OF THE INVENTION

A curable composition for use in the binding of fiberglass is provided comprising a mixture of an aldehyde or ketone and an amine salt of an inorganic acid. The preferred acid is phosphoric acid. This composition upon curing is capable of forming a water-insoluble binder which exhibits good adhesion to glass.

A process for binding fiberglass is provided comprising applying to fiberglass a composition comprising an aldehyde or ketone and an amine salt of an inorganic acid. Thereafter the composition is cured while present as a coating on the fiberglass to form a water-insoluble binder which exhibits good adhesion to the fiberglass.

In a preferred embodiment the resulting fiberglass product is a fiberglass mat as facer. In other embodiments the fiberglass product is a microglass-based substrate useful when forming a printed circuit board, battery separator, filter stock, or reinforcement scrim.

DETAILED DESCRIPTION OF PREFERRED EMBODIMENTS

The novel fiberglass binder of the present invention is a curable composition comprising a carbonyl functional material, such as an aldehyde or ketone, and an amine salt of an inorganic acid. Once the curable composition is applied to fiberglass, it can be cured to provide a strong, water-insoluble binder, exhibiting good adhesion to the glass. The curing of the binder has also been seen to be much faster, thereby adding to the economic benefits of the binder.

The salt can be any amine salt of an inorganic acid. This includes ammonium salts and amine-acid salts, which are amine salts. Any suitable inorganic acid can be used. The acids can be oxygenated acids or non-oxygenated acids. Preferred examples of suitable oxygenated acids include, but are not limited to, phosphoric acid, pyrophosphoric acid, phosphorus acid, sulfuric acid, sulfurous acid, hypochloric acid and chlorate acid. Preferred examples of non-oxygenated acids include, but are not limited to, hydrochloric acid, hydrogen sulfide and phosphine. Phosphoric acid is most preferred.

The salt can be prepared using any conventional technique to create salts of inorganic acids. Ammonium salts of an inorganic acid, e.g., phosphoric acid, is one of the preferred salts. Reacting ammonia with the acid will yield the salt. Amine-acid salts are also preferred, with such salts obtained by reacting the selected amine with the acid in water. This is a very simple and straightforward reaction. The molar ratio of acid functionality to amine functionality can vary, and is preferably from 1:25 to 25:1. More preferred is a ratio of from 1:5 to 5:1, with a ratio of about 1:2 to 2:1 being most preferred.

Preferred example of amines which can be used include, but are not limited to, aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, ethers and others. Preferred amines that are suitable for use in such an embodiment include ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, and mixtures of these. A particular preferred diamine for use in this embodiment of the invention are 1,4-butanediamine and 1,6-hexanediamine. Preferred examples of mono amines include, but are not limited to, methyl amine, ethyl amine, ethanol amine, diethanol amine, dimethyl amine, diethyl amine, aniline, N-methyl aniline, n-hydroxy theyl aniline, etc. Natural and synthetic amino acids such as glysine, lysine, arginine, histidine, cysteine, etc. can also be used.

To the solution of the amine salt of inorganic acid, the carbonyl functional materials can be added, especially an aldehyde or ketone. Due to their higher reactivity, aldehydes are preferred to ketones. The composition comprises the amine salt of inorganic acid and the aldehyde and/or ketone. Some small amount of reaction does take place within the composition between the components. However, the reaction is completed during the curing step, followed by the cross-linking reaction of curing.

Preferred examples of suitable aldehydes include, but are not limited to, mono- and multifunctional aldehydes including acetaldehyde, hydincy acetaldehyde, butyraldehyde, acrolein, furfural, glyoxal, glyceraldehyde, glutaraldehyde, polyfurfural, polyacrolein, copolymers of acrolein, and others. Reducing mono, di- and polysaccharides such as glucose, celobrose, maltose, etc. can be used, with reducing monosaccharides, such as glucose being preferred. In particular non-cyclic monosaccharides containing a ketone and/or aldehyde functional group and hydroxyl groups on most or all of the non-carbonyl carbon atoms are preferred. Most preferred monosaccharides are Triose (3 carbon atoms), Tetrose (4 carbon atoms), Pentose (5 carbon atoms), Hexose (6 carbon atoms) and Heptose (7 carbon atoms), in particular glucose (dextrose), fructose (levulose), galactose, xylose and ribose. The term monosaccharide includes also the Aldose or Ketose of the aforementioned monosaccharides. A molar ratio of salt to carbonyl (saccharide) can vary, but is generally in the range of from 1:50 to 50:1. A ratio of 1:20 to 20:1 is more preferred, with a ratio of 1:10 to 10:1 being most preferred.

Preferred examples of suitable ketones include, but are not limited to, acetone, acetyl acetone, 1,3-dihydroxy acetone, benzel, bonzoin and fructose.

The composition when applied to the fiberglass optionally can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

It has been found that in particular curable compositions comprising a thickener and/or rheology modifier provide improved properties, such as improved dry tensile strength and hot/wet tensile strength, of fiberglass mats, The thickener and/or rheology modifier can be polymeric-type materials which are at least partially water soluble or inorganic-type materials that are dispersed in water and which increase the viscosity without substantially modifying the other resin properties. Suitable polymeric thickeners are polysaccharides such as xanthan gum, guar gum, modified starches, neutralized polyacrylic acids, such as sodium polyacrylate, cellulose derivatives, polyacrylamides and polyvinylalcohols. Preferably such thickener and/or rheology modifier have a weight average molecular weight of at least about 100,000 and most typically below about 2,000,000, most preferably of at least about 200,000 and most typically below about 1,000,000. Inorganic thickeners include smectite clay and/or bentonite.

Preferred thickeners are based on hydroxyalkyl cellulose, such as hydroxyethyl cellulose, hydroxypropyl cellulose, hydroxyethyl methyl cellulose, hydroxypropyl methyl cellulose, or carbon/alkyl cellulose, such as carboxymethyl cellulose.

The amount of thickener and/or rheology modifier being present in the curable composition is preferably from 0.01 to 3 weight percent (based on dry mass), most preferably from 0.05 to 0.1 weight percent (based on dry mass).

In addition, it has been found that in particular curable compositions comprising a 10 to 50 weight percent (based on dry mass), most preferably from 20 to 40 weight percent (based on dry mass) of a carbon black dispersion offers excellent blacking performance. The water based carbon black dispersion comprises typically water, 40 to 50 weight percent carbon black, 0.1 to 5 weight percent, preferably 0.1-2 weight percent cationic or non-ionic emulsifiers. The water based carbon black dispersion typically may further comprise other additives such as silanes, de-foamer and wetting agents for glass fibers. Instead of using a water based carbon black dispersion being added to the curable compositions, it is also possible to add the carbon black directly to the curable compositions. This, however, is less preferred for handling reasons. The aforementioned curable compositions comprising carbon black provide sufficient blackness when used in so called facer materials, which are fibrous materials predominately based on glass fibers.

The carbon black preferably has particle size of 70 nm or less, most preferred from 5 nm to 70 nm, in particular from 10 nm to 30 nm. Such carbon black materials are available for example from Brockhuis GmbH & Co KG (Rockwood Pigments NA, Inc).

The fiberglass that has the composition according to the present invention applied to it may take a variety of forms and in a preferred embodiment is Fiberglass mat, preferably facer mats. Use in roofing membranes is also preferable as good tensile and elongation is observed. In other embodiments the fiberglass is a microglass-based substrate useful in applications such as printed circuit boards, battery separators, filter stock, and reinforcement scrim.

The composition of the present invention can be applied to the fiberglass by a variety of techniques like spraying, spin-curtain coating, and dipping-roll coating. In a most preferred embodiment the inventive binder composition is applied to the non-woven using state of the art standard binder application methods as it is widely used in the industry. Water or other solvents can be removed by heating.

Thereafter the composition undergoes curing wherein a strong binder coating is formed which exhibits good adhesion to glass. Such curing can be conducted by heating. Elevated curing temperatures on the order of 100 to 300° C. generally are acceptable. Satisfactory curing results are achieved by using standard heating and drying processes as it is commonly used for the glass fiber mat production. Temperatures of around 200° C. in an air oven at line speed are typically sufficient.

The amount of cured binder at the conclusion of the curing step commonly is approximately 10 to 30 percent by weight, and most preferably 12 to 20 percent by weight of the total weight of the mat.

The inventive binder composition can be applied to all kind of different fibrous substrates. The fibrous substrate can be a woven or non-woven material, and can comprise filaments, chopped fibers, staples fibers or mixtures thereof. Polymer fibers and glass fibers are preferred, however all kind of fiber materials which are compatible with the inventive binder composition can be used.

The inventive composition is particularly advantageous for glass fiber nonwoven used as facer. The intensive black color allows a large variety of different applications. The inventive composition is particularly suitable for facer mats with a total weight between 20 to 200 g/sqm, having a preferred weight range between 40 to 100 g/sqm total mat weight.

The facer mats used in the present invention typically comprises at least one non-woven web bonded together with the inventive binder. The web comprises chopped continuous glass fibers, of which preferably at least about 90 percent, more preferably at least about 95 percent, and most preferably least about 97 percent have a fiber diameter within the range of 1 to 30 µm, most preferred within the range of 7µ to 13µ. For some applications it is preferred to have a very narrow range of about 11±1.5 µm as described it WO2005/005118 which disclosure is hereby entirely incorporated by reference.

Further, it is also possible that the web has several layers of chopped glass fibers, preferably an outer layer of glass fibers having a diameter from 1 to 10 µm and an inner layer of glass fibers having a diameter from 12 to 30 µm. In such case the inner layer provides mechanical strength and the outer layer is aesthetically pleasing. More details about such facer materials can be found in EP-A-1,800,853 which disclosure is hereby entirely incorporated by reference.

In addition, it is also possible that the web comprises of a blend of chopped glass fibers, preferably a major portion of chopped glass fibers have a diameter from 8 to 17 µm while the minor portion of the chopped glass fibers have a diameter of less than about 5.5 µm. The minor portion is typically present in about 1 to 30 weight percent of the dry weight of the web. More details about such facer materials can be found in WO-A-2005/005117 which disclosure is hereby entirely incorporated by reference.

Although mixtures of different lengths of chopped strand fibers are contemplated and included within the scope of the invention, it is most preferred that a majority of the fibers have lengths of about 0.20 inches to 1.5 inches, more preferred from about 0.25 inches to 0.6 inches.

Chopped strand fibers are readily distinguishable from staple fibers by those skilled in the art. Staple fibers are usually made by processes such as rotary fiberization or flame attenuation of molten glass known in the fiber industry. They typically have a wider range of lengths and fiber diameters than chopped strand fibers. By way of contrast, it would have been anticipated that the smoothest mats would be obtained with a preponderance of fine fibers.

A preferred continuous glass fiber for fibrous web is at least one member selected from the group consisting of E, C, T and S type and sodium borosilicate glasses, and mixtures thereof. As is known in the glass art, C glass typically has a soda-lime-borosilicate composition that provides it with enhanced chemical stability in corrosive environments, and T glass usually has a magnesium aluminosilicate composition and especially high tensile strength in filament form. E glass which is also known as electrical glass typically has a calcium aluminoborosilicate composition and a maximum alkali content of 2.0%. E glass fiber is commonly used to reinforce various articles. The web is preferably composed of C glass or E glass.

If required by the later application, the inventive binder used for the present web may comprise an effective amount of a water repellant, for example, vinyl acrylate latex copolymers or stearylated melamine in typical amounts of about 3 to 10 wt. %.

The web may contain further fillers, pigments, or other inert or active ingredients either throughout the mat or concentrated on a surface. For example, the mat can contain effective amounts of fine particles of limestone, glass, clay, coloring pigments, biocide, fungicide, intumescent material, or mixtures thereof. Such additives may be added for known structural, functional, or aesthetic qualities imparted thereby. These qualities include additional coloration, modification of the structure or texture of the surface, resistance to mold or fungus formation, and fire resistance. Preferably, flame retardants sufficient to provide flame resistance, e.g. according to NFPA Method 701 of the National Fire Protection Association or ASTM Standard E84, Class 1, by the American Society for the Testing of Materials, are added. Biocide is preferably added to the mat to resist fungal growth, its effectiveness being measurable in accordance with ASTM Standard D3273.

Beside the chopped glass fibers, the web may contain a minor portion of other fibers, either in addition to or in replacement of glass fibers, such as mineral fibers, such as mineral wool, slag wool, ceramic fibers, carbon fibers, metal fibers, refractory fibers, or mixtures thereof. Other synthetic or polymer fibers, such as melt blown micro denier fibers or melt spun fibers of polyester, nylon, polyethylene, polypropylene, or the like, may also be used.

The non-woven web used in the facer mat has preferably a total weight ranging from about 20 to 200 $g/m^2$, more preferred from 25 to 150 $g/m^2$, and most preferred from 30 to 100 $g/m^2$.

The present invention provides a formaldehyde-free route to form a securely bound formaldehyde-free fiberglass product. The binder composition of the present invention provides advantageous flow properties, the elimination of required pH modifiers such as sulfuric acid and caustic, and improved overall economics and safety. The binder also has the advantages of being stronger and offering lower amounts of relative volatile organic content during curing, which ensures a safer work place and environment. The cure time of the binder is also seen to be much faster and therefore does favor the economics, while reducing the energy consumption during the curing process and lowering the carbon footprint. The binder also contains a high level of sustainable raw materials further reducing the dependency on fossil based sources for the resin.

That which is claimed is:

1. A facer material comprising:
    a curable composition, and
    a non-woven web, wherein:
        the curable composition comprises an aldehyde or ketone and an amine salt of an inorganic acid,
        the non-woven web is bonded to the curable composition,
        the amine salt is an organic amine salt,
        the molar ratio of the amine salt to the aldehyde or ketone is 1:3 to 1:10,
        the composition is formaldehyde-free,
        the aldehyde or ketone is present in a saccharide, and
        the amine of the amine salt is a diamine having at least one primary amine group.

2. The facer material of claim 1, wherein the non-woven web comprises chopped glass fibers.

3. The facer material of claim 2, wherein at least about 90 percent of the chopped glass fibers have a fiber diameter in the range from 1 to 30 μm.

4. The facer material of claim 1, wherein the non-woven web has a total weight from 20 to 200 g/m2.

5. The facer material of claim 1, wherein:
    the non-woven web is a first non-woven web, and
    the facer material comprises a second non-woven web.

6. The facer material of claim 5, wherein:
    the first non-woven web comprises glass fibers having a diameter in the range from 1 to 10 μm, and
    the second non-woven web comprises glass fibers having a diameter in the range from 12 to 30 μm.

7. The facer material of claim 1, wherein:
    the non-woven web comprises a first portion of chopped fibers having a diameter in the range from 1 to 30 μm,
    the non-woven web comprises a second portion of chopped fibers having a diameter less than about 5.5 μm, and
    the second portion is present in about 1 to 30 weight percent of the dry weight of the non-woven web.

8. The facer material of claim 1, wherein:
    the non-woven web comprises chopped fibers, and
    the majority of the chopped fibers have a length in the range from 0.20 inches to 1.5 inches.

9. The facer material of claim 1, further comprising a water repellant.

10. The facer material of claim 1, further comprising fillers or pigments.

11. The facer material of claim 10, wherein the fillers or pigments are distributed throughout the facer material.

12. The facer material of claim 10, wherein the fillers or pigments are concentrated on a surface of the facer material.

13. The facer material of claim 1, wherein:
    the non-woven web comprises a first portion of chopped glass fibers,
    the non-woven web comprises a second portion of fibers that are not glass fibers, and
    the first portion is greater than the second portion.

14. The facer material of claim 1, wherein the inorganic acid is phosphoric acid.

15. The facer material of claim 1, wherein the amine salt is an amine-acid salt.

16. The facer material of claim 15, wherein the amine is selected from the group consisting of ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, diamino benzene, and mixtures thereof.

17. The facer material of claim 1, wherein the aldehyde is used with the amine salt.

18. The facer material of claim 1, wherein the ketone is used with the amine salt.

19. The facer material of claim 1, wherein the saccharide is selected from the group consisting of dextrose, fructose, galactose, xylose, and ribose.

* * * * *